United States Patent
Koyanagi et al.

(10) Patent No.: US 6,898,742 B2
(45) Date of Patent: *May 24, 2005

(54) SYSTEM AND METHOD FOR AUTOMATIC DESKEW ACROSS A HIGH SPEED, PARALLEL INTERCONNECTION

(75) Inventors: Yoichi Koyanagi, Cupertino, CA (US); Richard L. Schober, Jr., Cupertino, CA (US); Raghu Sastry, Santa Clara, CA (US); Hirotaka Tamura, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/300,389

(22) Filed: Nov. 19, 2002

(65) Prior Publication Data

US 2003/0074609 A1 Apr. 17, 2003

Related U.S. Application Data

(62) Division of application No. 09/249,935, filed on Feb. 12, 1999, now Pat. No. 6,636,993.

(51) Int. Cl.[7] ............................................ G06K 5/04
(52) U.S. Cl. ...................... 714/700; 714/798; 341/120
(58) Field of Search ................... 714/700, 762, 714/798; 327/104–107, 140–141, 150, 153, 144, 151, 175, 276, 279, 403, 286, 292; 370/519–521, 506–517, 536, 541, 503, 535, 540, 542; 375/330, 371, 260, 362; 341/120, 143; 380/268; 377/76; 360/13, 51, 53

(56) References Cited

U.S. PATENT DOCUMENTS

| | | | |
|---|---|---|---|
| 4,985,900 A | | 1/1991 | Rhind et al. |
| 5,237,224 A | | 8/1993 | DeLisle et al. |
| 5,408,473 A | * | 4/1995 | Hutchison et al. .......... 370/506 |
| 5,727,021 A | | 3/1998 | Truebenbach |
| 6,247,138 B1 | | 6/2001 | Tamura et al. |
| 6,493,320 B1 | | 12/2002 | Schober et al. |

FOREIGN PATENT DOCUMENTS

| | | |
|---|---|---|
| EP | 0 659 001 A2 | 6/1995 |
| EP | 0 759 664 A2 | 2/1997 |

OTHER PUBLICATIONS

"Programmable Memory Controller", IBM Technical Disclosure Bulletin, vol. 31, No. 9, Feb. 1, 1989, pp. 351–354.
"Scheme for Reducing Clock Skew in Multiple–Chip System Design"; IBM Technical Disclosure Bulletin, vol. 30 No. 2, Jul. 1987; pp. 568–572.
"Data Transfer Through Cross–Bar Matrix Using Parallel, Asynchronous Data Paths"; IBM Technical Disclosure Bulletin; vol. 36 No. 06A, Jun. 1993, pp 457–458.

* cited by examiner

Primary Examiner—Guy J. Lamarre
(74) Attorney, Agent, or Firm—Fenwick & West LLP

(57) ABSTRACT

A method and system performs automatic deskew tuning and alignment across high-speed, parallel interconnections in a high performance digital system to compensate for inter-bit skew. Rather than using a VDL, digital elements such as registers and multiplexers are used for performing the automatic deskew tuning and alignment procedure. The result is a simpler, more robust deskew system capable of operating over a wider range of input values with greater accuracy and over a broader range of temperatures. In addition, the method and apparatus performs a one to four unfolding of the signal on each interconnection. The system includes a deskew controller and a plurality of deskew subsystems. The deskew controller automatically computes the amount of delay needed to correct the skew on each interconnection and feeds a different (or appropriate) delay value to each deskew subsystem located at the receiving end of each interconnection.

23 Claims, 17 Drawing Sheets

Timing Diagram

| Value 320 add-delay | output 350a out0 | output 350b out1 |
|---|---|---|
| 0 | Dn | Dn+1 |
| 1 | Dn-1 | Dn |

FIG. 5

| bit 325 | delay bit 330 | line 335a out0 | line 335b out1 |
|---|---|---|---|
| 0 | 0 | Ⓓ′ | Ⓐ′ |
| 0 | 1 | Ⓒ′ | Ⓓ′ |
| 1 | 0 | Ⓕ′ | Ⓒ′ |
| 1 | 1 | Ⓔ′ | Ⓕ′ |

FIG. 8

SYSTEM AND METHOD FOR AUTOMATIC DESKEW ACROSS A HIGH SPEED, PARALLEL INTERCONNECTION

CROSS-REFERENCE TO RELATED APPLICATION

This patent application is a divisional of U.S. patent application Ser. No. 09/249,935, entitled "System and Method for Automatic Deskew Across a High Speed Parallel Interconnection," which was filed on Feb. 12, 1999, and the contents of which are hereby incorporated by reference, and which is related to the subject matter of U.S. patent application Ser. No. 09/249,825 now U.S. Pat. No. 6,636,993, entitled "Automatic Initialization and Tuning Across a High Speed, Plesiochronous, Parallel Link," which was filed Feb. 12, 1999.

BACKGROUND OF THE INVENTION

1. Field of the Invention

The present invention relates to an automatic deskew system and method for use in high-speed, parallel interconnections for digital systems, including high performance microprocessor systems, memory systems, and input/output ("I/O") systems.

2. Description of Background Art

As data communication speeds increase in high performance digital systems and as the length of signal lines, for example copper or optical cables or printed circuit board traces, connecting the components of such high performance digital systems increases, the skew of the data arrival time at the receiving end of each signal line for parallel interconnections becomes significant. The skew on each signal line results from differences in the characteristics and length of each cable, connector or printed circuits board trace. Moreover, the skew is aggravated by the high data transfer rates.

Conventional deskew circuits exist to solve the problem of inter-bit skew on high-speed, parallel interconnections; however, conventional deskew circuits typically make use of an analog device called a variable delay line ("VDL"). A VDL adds an amount of delay to a one bit skewed data input so as to align such one bit data input with other data input bits on parallel signal lines.

Conventional VDLs have numerous problems. First, it is difficult and expensive to make a VDL that can operate over a wide range of inputs and with a high degree of accuracy. The wider the range of operation and the better the accuracy of the VDL, the greater the number of delay elements, typically buffers, required. These buffers occupy space and increase overall chip size and pin connections and are, therefore, expensive.

Second, it is difficult to create a VDL with linear behavior. Linearity in a VDL is a desirable characteristic. If, for example, a VDL produces a two microsecond delay for an input value of one and a four microsecond delay given input value two, the VDL should produce a six microsecond delay given an input value of three. If instead the VDL produced a ten microsecond delay given input value of three, then the wrong amount of delay would be added to the skewed input data line and misalignment among the parallel input data lines would result.

Third, VDLs are not temperature-stable. For example, a VDL operating in low temperature conditions may output a delay of two microseconds given a certain input and a delay of three microseconds given the same input if operating in high temperature conditions. Thus, if a conventional deskew circuit containing a VDL is placed in a temperature variable environment, the performance of the VDL is unreliable. As a result, an incorrect amount of delay gets added to the one bit skewed input, resulting in misalignment of signals on parallel lines.

In addition to adding delay to correct for skew on parallel data input lines, conventional deskew circuits may also perform the task of "unfolding". Specifically, in the case of a one to four unfolding circuit, four consecutive bits of a data signal are converted to an output signal of four bits width, one bit per output and each output bit having a rate one fourth that of the input. A purpose for slowing the rate of the input and unfolding is to make the design of the core logic circuit in the digital system easier. Generally the core logic circuit in such a system is quite complicated, thus a slower operation frequency facilitates design. Conventional deskew circuits typically perform the tasks of adding delay and unfolding sequentially.

Given the foregoing, there is a need for an automatic deskew system for use in high-speed, parallel interconnections for digital systems that: (i) operates over a wide range of inputs with accuracy; (ii) is suitable in temperature-variable environments; and (iii) performs unfolding.

SUMMARY OF THE INVENTION

The present invention includes a system and method for performing automatic deskew tuning and alignment across high-speed, parallel interconnections in a high performance digital system to compensate for inter-bit skew. Rather than using a VDL, the present invention includes digital elements, such as registers and multiplexers, which result in a simpler, more robust system capable of operating over a wider range of input values with greater accuracy and over a broader range of temperatures. In addition, the present invention performs a one to four unfolding of the signal on each interconnection.

A system in accordance with the present invention may include a deskew controller and a plurality deskew subsystems. The deskew controller computes the amount of delay needed to correct the skew on each interconnection and feeds a different (or appropriate) delay value to each deskew subsystem located at the receiving end of each interconnection.

Each deskew subsystem includes a clock recovery subsystem, a retiming subsystem and two coarse deskew subsystems. The clock recovery subsystem corrects skew that is less than the period of time for the transmission of one bit of information on an interconnection ("one bit time" or "T").

The retiming subsystem and the coarse deskew subsystem collectively correct for any remaining skew by adding delay in integer multiples of one bit time, T, from 0T to 7T. The retiming subsystem and the coarse deskew subsystems collectively perform a one to four unfolding of the input signal.

The final output of the automatic deskew system is a one to four unfolding of each data input signal line and an alignment of all data on parallel interconnections in the digital system.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 5 illustrates an input/output table for the multiplexer contained in an embodiment of the retiming subsystem.

FIG. 8 illustrates an input/output table for the multiplexer contained in an embodiment of the coarse deskew subsystem.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digits of each reference number corresponds to the figure in which the reference number is first used. The present invention relates to a system and a method for automatic deskew for use in high-speed, parallel interconnections for digital systems.

Figure 1:
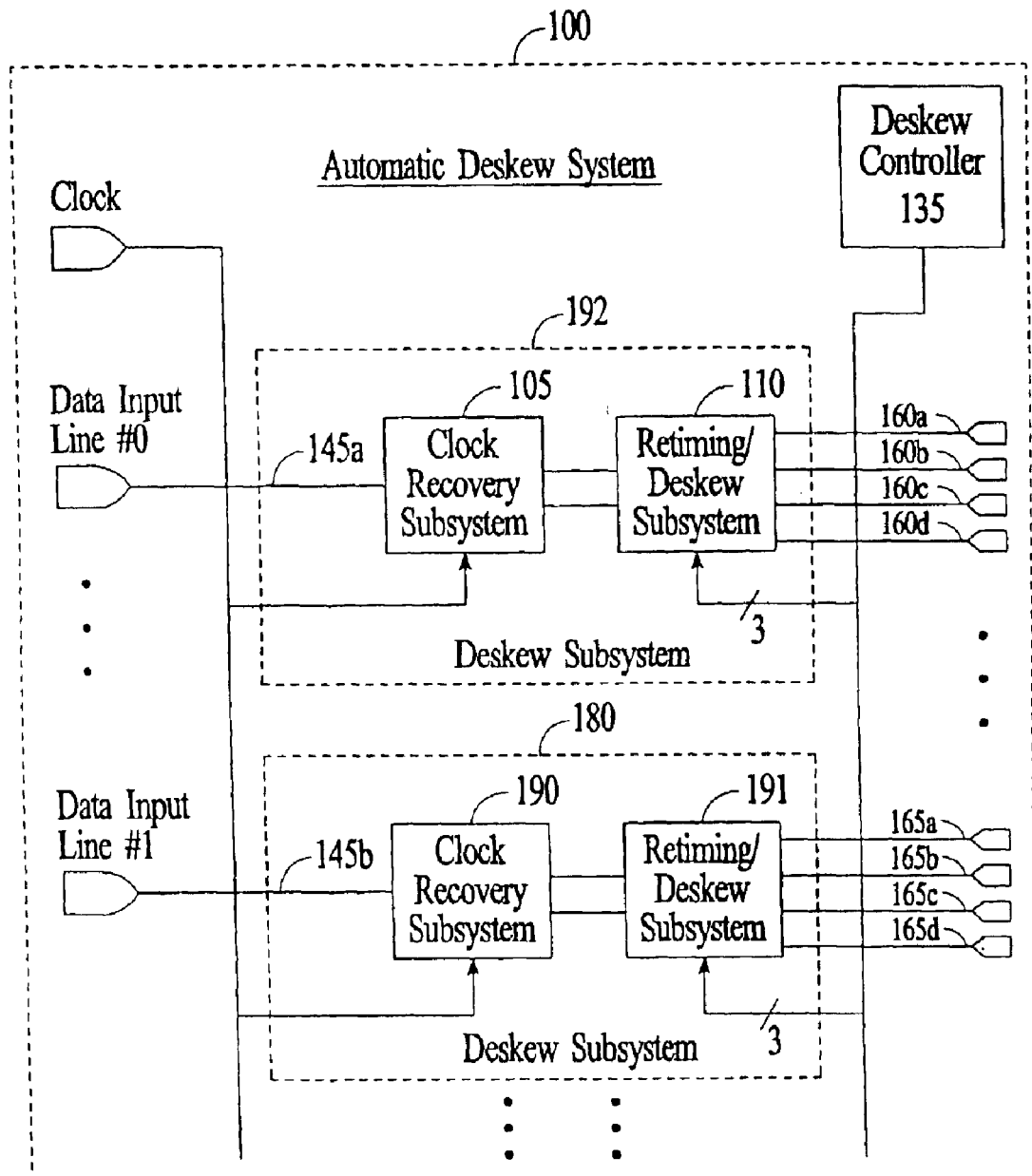
FIG. 1 is a block diagram of an automatic deskew system in accordance with an embodiment of the present invention.

FIG. 1 is a block diagram of an automatic deskew system 100 for use in high-speed, parallel interconnections for digital systems in accordance with one embodiment of the present invention. The digital system may be, for example, a high performance microprocessor, memory system or router chip.

The automatic deskew system 100 includes a plurality of deskew subsystems 192 and 180, and a deskew controller 135. One deskew subsystem resides at the receiving end of each parallel interconnection. In accordance with the present invention, the automatic deskew system has at least two deskew subsystems, but the precise number of such deskew subsystems varies depending upon the number of parallel interconnections in the digital system.

A deskew subsystem has a single bit input 145a which receives a skewed signal and a four bit output 160a–160d, and is coupled to the deskew controller 135. The signal on input 145a carries one bit of information every one bit time, T. "One bit time" or "T" is defined as 1/N seconds where N is the number of bits of information transmitted on an interconnection in one second. The signals on the four bit output 160a–160d are corrected for skew and unfolded. In other words, each output is properly aligned with the other output signals and the rate of each output has been reduced by a factor of four relative to the input 145a.

Figure 2:
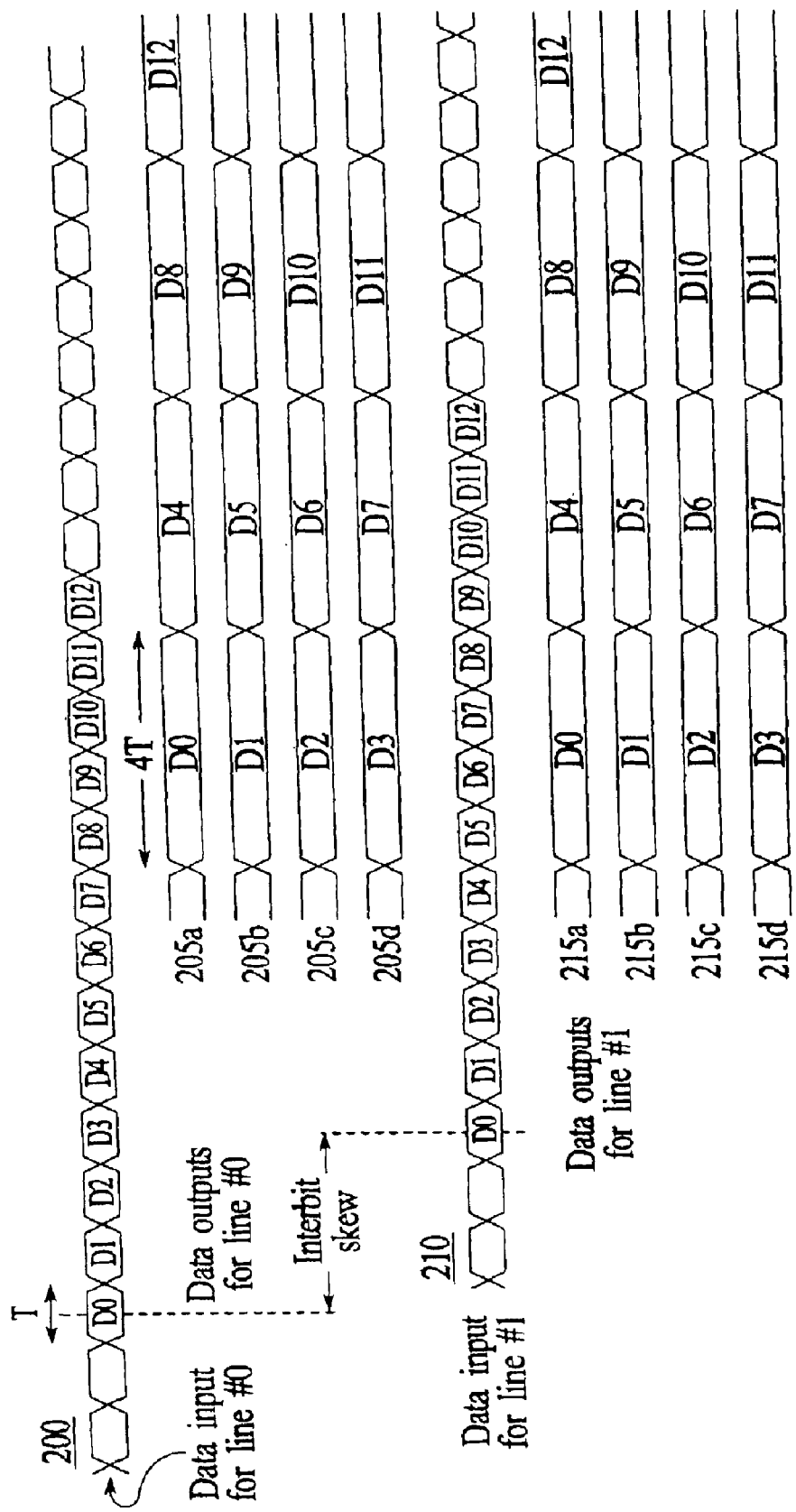
FIG. 2 illustrates a timing diagram for an automatic deskew system in accordance with the present invention.

FIG. 2 illustrates the timing diagram of the input and output values of a deskew subsystem and the automatic deskew system as a whole. The timing diagram for the data arriving on input line 145a is shown in 200 and for the data arriving on input un 145b is shown in 210. As shown in FIG. 2, the data 210 arriving on input line 145b is delayed by approximately 3T relative to the data 200 arriving on input line 145a. The difference in arrival time represents the skew between input lines 145a and 145b. The automatic deskew system 100 corrects for the skew so that 205a–205d is aligned with 215a–215d and unfolds the signals 200 and 210 on input lines 145a and 145b, respectively, so that the rate of the output signals is decreased by four.

As illustrated in FIG. 1, the deskew subsystem 192, includes a clock recovery subsystem 105, and a retiming/deskew subsystem 110. Similarly, the deskew subsystem 180 includes a clock recovery subsytem 190 and a retiming/deskew subsystem 191. A clock recovery subsystem corrects for skew which is less than one bit time, e.g., 0.5T. The clock recovery subsystem is further described in U.S. patent application Ser. No. 09/093,056 now U.S. Pat. No. 6,247,138, which is assigned to the same assignee as this present patent application, and which is hereby incorporated by reference.

Figure 3:
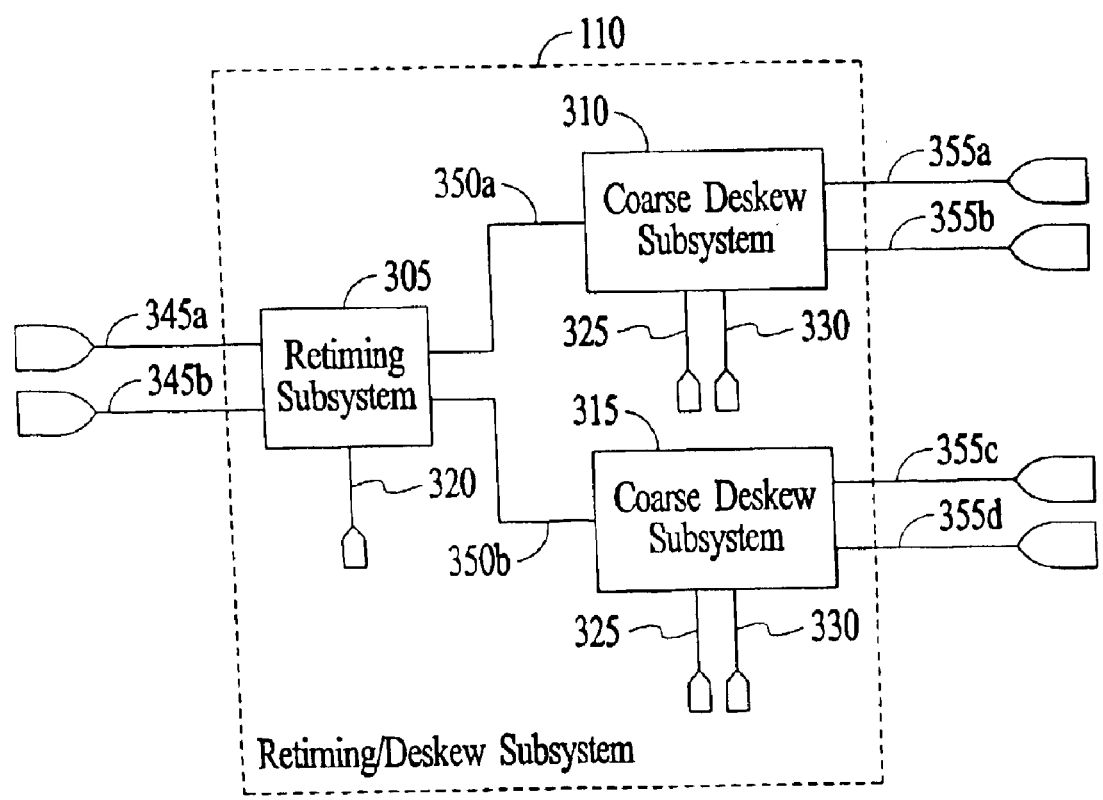
FIG. 3 is a block diagram of a retiming/deskew subsystem in accordance with the present invention.

FIG. 3 illustrates a block diagram of an embodiment of a retiming/deskew subsystem in accordance with the present invention. A retiming/deskew subsystem 110 includes a retiming subsystem 305 and two coarse deskew subsystems 310 and 315. The retiming/deskew subsystem 110 is coupled to the clock recovery subsystem 105 and a deskew controller 135. Based upon delay control values 320, 325 and 330 computed by the deskew controller 135, the retiming/deskew subsystem provides an integer multiple of one bit time delay up to seven bit time delay, i.e., 0T, 1T, 2T, 3T, 4T, 5T, 6T or 7T, to input signals 345a and 345b so that the clock recovery subsystem 105 and the associated deskew subsystem 110 collectively correct for any skew on input line 145a. The deskew subsystem 192 (FIG. 1) also performs a one to four unfolding of such signal at its outputs 160a–160d.

The timing diagrams shown in 205a–205d and 215a–215d illustrate the outputs of the automatic deskew system, which outputs have corrected for skew on lines 145a and 145b, respectively.

As illustrated in FIG. 3, a retiming subsystem 305 comprises two inputs 345a and 345b, an add delay input for receiving the delay control value 320, and two outputs 350a and 350b. A coarse deskew subsystem 310 has one input 350a, two delay control inputs for receiving delay control values (bits) 325 and 330, and two outputs 355a and 355b. Each output of the retiming subsystem 305 is coupled to an input of a coarse deskew subsystem. The retiming subsystem 305 delays the signal on inputs 345a and 345b by 0T or 1T, depending on the value of the add delay input 320, and performs a one to two unfolding of the signal on inputs 345a and 345b.

Figure 4:
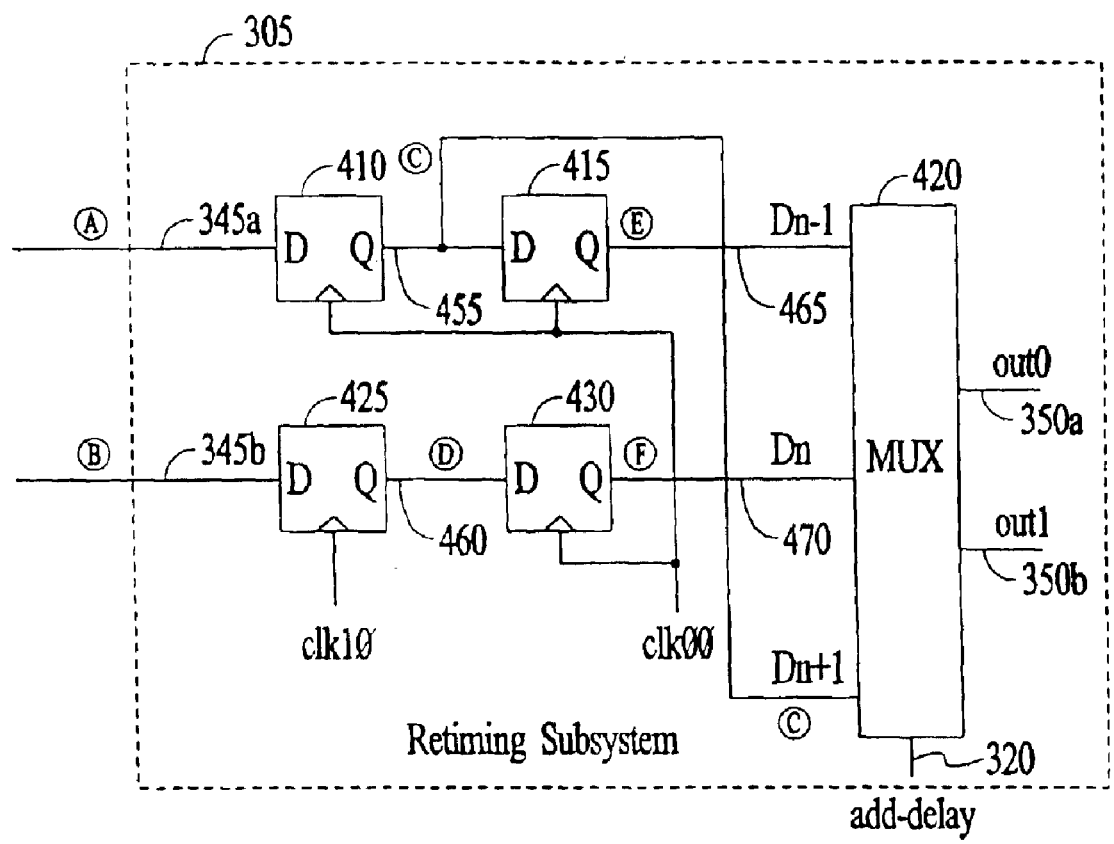
FIG. 4 is a schematic diagram of an embodiment of the retiming subsystem in accordance with the present invention

FIG. 4 illustrates an embodiment of the retiming subsystem 305. As shown in FIG. 4, the retiming subsystem 305 includes registers 410, 415, 425 and 430 and a multiplexer 420. The registers are coupled so that the outputs of such registers perform a one to two unfolding of the two inputs 345a and 345b, with 0T or 1T delay.

Figure 6:
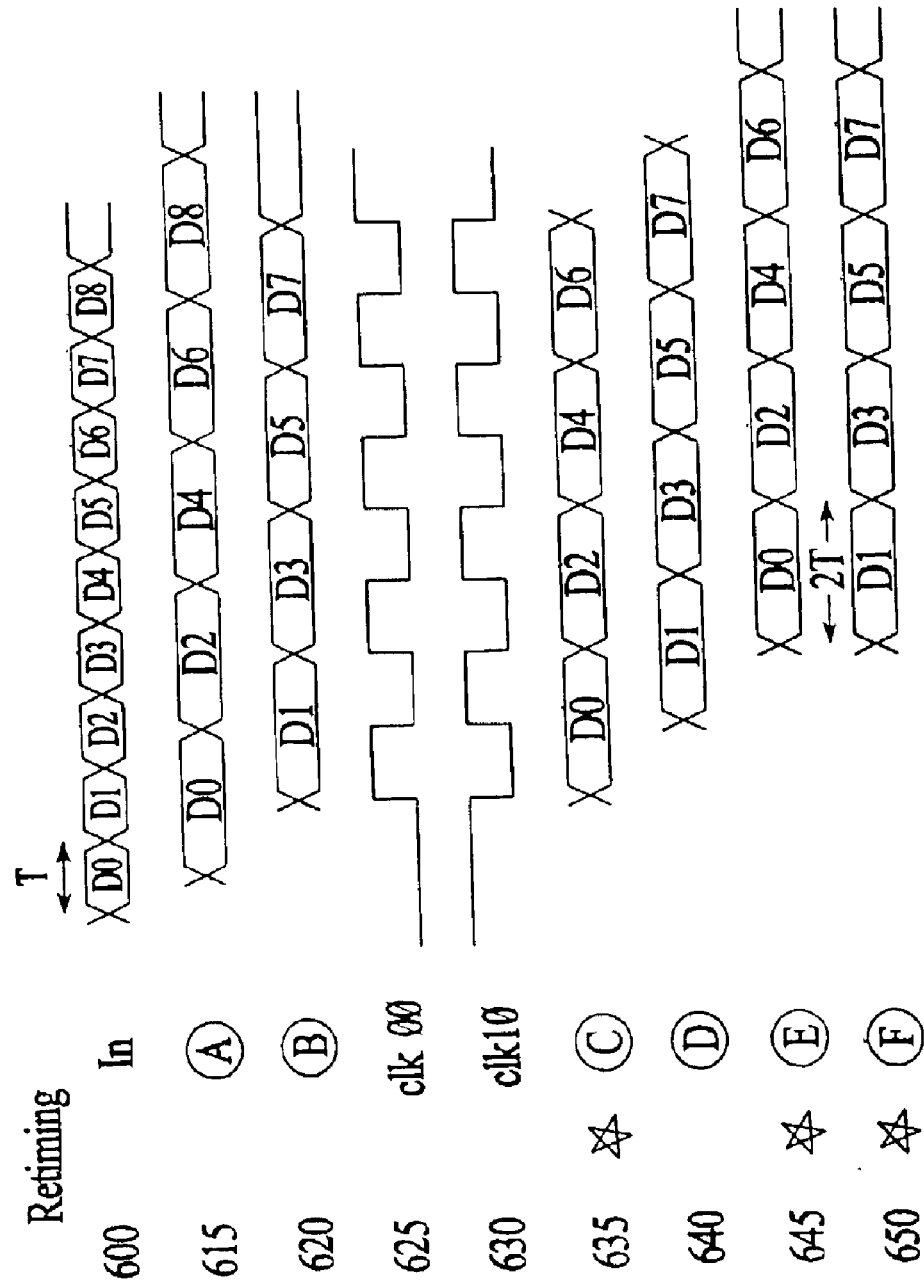
FIG. 6 illustrates the timing diagrams for the retiming subsystem.

FIG. 6 illustrates a timing diagram for the retiming subsystem 305. Input signal 600 transmits one bit of information every one bit time, T, wherein the input signal 600 is received via line 145a (FIG. 1). The timing diagrams of the unfolded outputs of registers 410, 415 and 430 are shown in 635, 645 and 650, respectively. The signals shown in 645 are delayed by two bit times, 2T, relative to the signal shown in 635.

The multiplexer 420 shown in FIG. 4 has three inputs 455, 465 and 470, an input for receiving the one bit add delay control 320, and two outputs 350a and 350b. The multiplexer 420 is coupled to the outputs of registers 410, 415 and 430. As shown in FIGS. 4 and 5, based upon the value of the add delay control value 320, which is received from and computed by the deskew controller 135 (FIG. 1), the multiplexer 420 selects two consecutive bits of the delayed and unfolded outputs from registers 410, 415, and 430. The only difference between the two possible outputs of the multiplexer 420 is a delay of 0T or 1T. In short, the retiming subsystem 305 is capable of delaying a signal by 0T or 1T, and performing a one to two unfold of the input signal.

Figure 7:
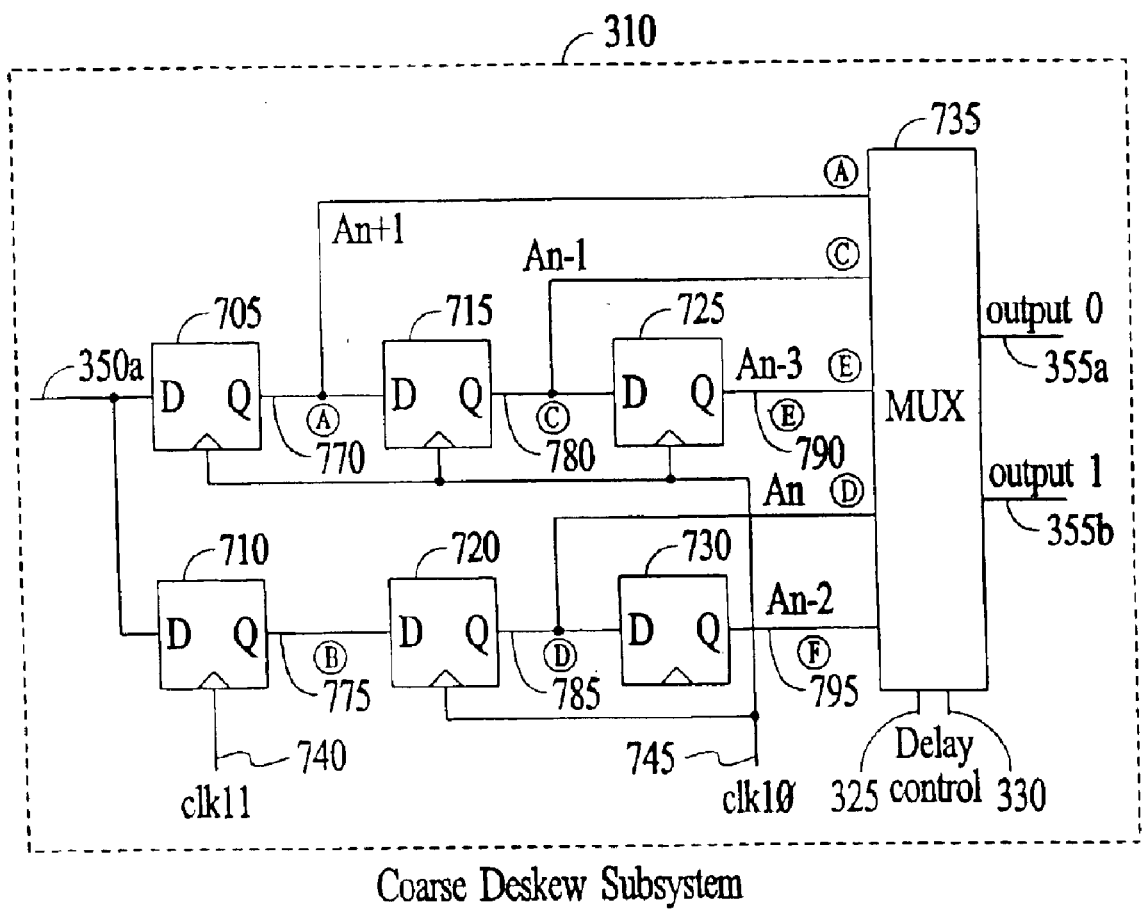
FIG. 7 is a schematic diagram of an embodiment of a coarse deskew subsystem in accordance with the present invention.

FIG. 7 illustrates an embodiment of the coarse deskew subsystem 310. The coarse deskew subsystem 310 includes registers 705, 710, 715, 720, 725 and 730 and a multiplexer 735. The registers are coupled so that the outputs of such registers perform a one to two unfolding of input 350a, with delay of 0T, 2T, 4T or 6T, depending on the delay control values 325 and 330 from deskew controller 135.

Figure 9:
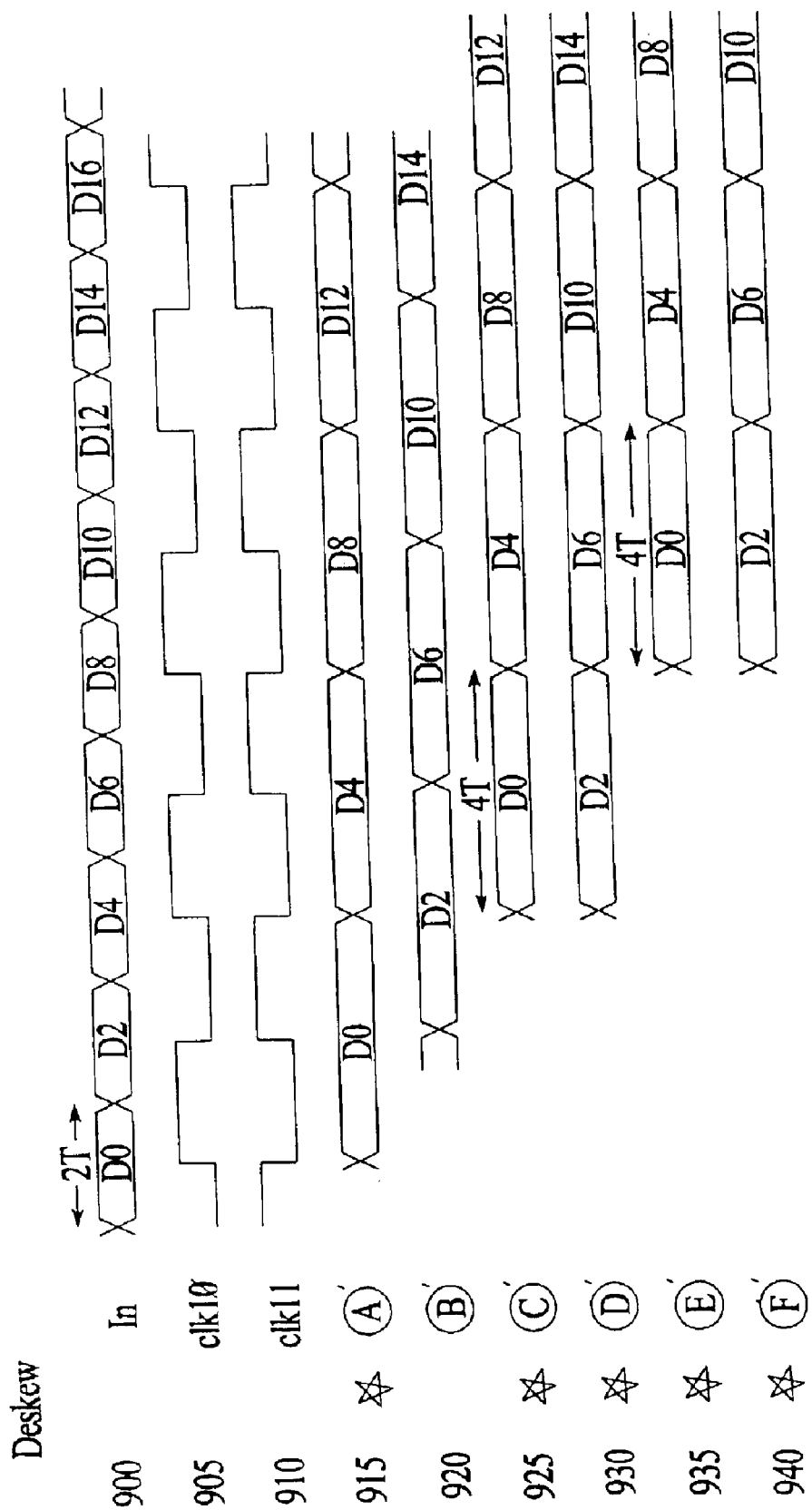
FIG. 9 illustrates the timing diagram for the coarse deskew subsystem.

FIG. 9 illustrates the timing diagram for the coarse deskew subsystem 310. Input signal 900 delivers one bit of information every two bit time, 2T wherein the input signal 900 is received via line 350a. The timing diagrams of the unfolded outputs of registers 705, 715, 720, 725 and 730 are shown in 915, 925, 930, 935 and 940 respectively. The signal shown in 935 is delayed by eight bit time, 8T, relative to signal 915 and four bit time, 4T, relative to signal 925. Signal 940 is delayed by four bit time, 4T, relative to signal 930.

The multiplexer 735 shown in FIG. 7 has five inputs 770, 780, 790, 785 and 795, an input for receiving the two bit delay control values 325 and 330, and two outputs 355a and 355b. The multiplexer 735 is coupled to the outputs of registers 705, 715, 720, 725 and 730. As shown in FIGS. 7 and 8, based upon the values of the delay control bits 325 and 330, which are computed by the deskew controller 135, the multiplexer 735 selects two consecutive bits of the unfolded output. The only difference among the four possible outputs of the multiplexer 735 is a delay of 0T, 2T, 4T or 6T.

In short, the retiming/deskew subsystem 110 (including the two coarse deskew subsystems 310 and 315 coupled to the output of the retiming subsystem 305) is capable of delaying an input signal by 0T, 1T, 2T, 3T, 4T, 5T, 6T or 7T, and performing a one to four unfold of the input signals 345a and 345b, with each of the four output bits 355a–355d in alignment and having a transmission rate one-fourth that of the input signal 145a.

Each retiming/deskew subsystem 110 and 191 is coupled to the deskew controller 135. The deskew controller 135 computes a three bit delay value for each interconnection. As shown in CHART 1 below, the least significant bit (LSB) from deskew controller is fed as a retiming add-delay bit 320 into the retiming subsystem 305, while the most significant two bits (MSB1 and MSB2) are fed as coarse deskew add-delay bits 325 and 330 into coarse deskew subsystems 310 and 315. The amount of added delay based on the values of the bits MSB1, MSB2 and LSB are shown in the third column of CHART 1 below.

CHART 1 delay control from deskew controller 135

| MSB1 (bit 325) | MSB2 (bit 330) | LSB (bit 320) | amount of added delay |
|---|---|---|---|
| 0 | 0 | 0 | 0 T |
| 0 | 0 | 1 | 1 T |
| 0 | 1 | 0 | 2 T |
| 0 | 1 | 1 | 3 T |
| 1 | 0 | 0 | 4 T |
| 1 | 0 | 1 | 5 T |
| 1 | 1 | 0 | 6 T |
| 1 | 1 | 1 | 7 T |

These delay values 320, 325 and 330 are unique to each interconnection and permit the retiming/deskew subsystem 110 to compensate differing skew on each parallel interconnection so as to align the outputs on each parallel interconnection.

Figure 10A:
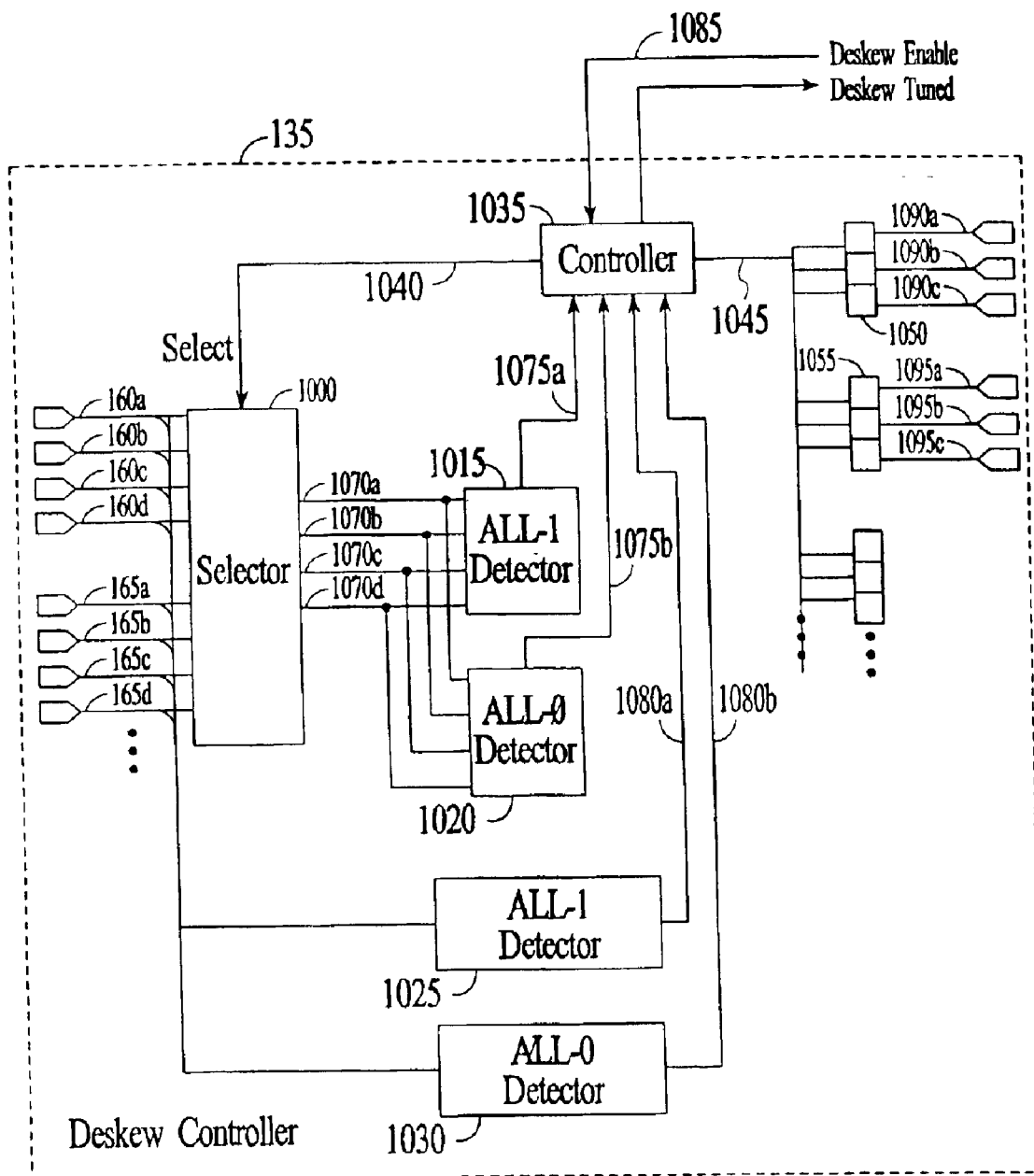
FIG. 10A is a block diagram of a deskew controller in accordance with an embodiment of the present invention.

FIG. 10A illustrates a functional block diagram of the deskew controller 135. The deskew controller 135 includes a selector 1000, a controller 1035, four detectors 1015, 1020, 1025 and 1030, and a plurality of registers 1050 and 1055, the number of registers depends upon the number of parallel interconnections.

The deskew controller 135 is enabled by an enable signal 1085 from any suitable control unit. One suitable control unit is disclosed in U.S. patent application Ser. No. 09/249, 825, now U.S. Pat. No. 6,493,320, entitled "Automatic Initialization and Tuning Across a High Speed, Plesiochronous, Parallel Link," filed on Feb. 12, 1999, by Richard L. Schober Jr. et al., which is assigned to the same assignee as this present patent application, and which is hereby incorporated by reference.

A selector 1000 receives the outputs of the deskew subsystems 192 and 180 in the digital system. As illustrated in FIG. 10A, outputs 160a–160d of deskew subsystem 192 associated with input 145a and outputs 165a–165d of deskew subsystem 180 associated with input 145b feed into selector 1000. The selector 1000 selects the outputs of one of the deskew subsystems based upon an input 1040 from the controller 1035.

The outputs 1070a–1070d of the selector 1000 are received by a detector 1015 which detects for all "1" values and a detector 1020 which detects for all "0" values.

The outputs 1075a and 1075b of detectors 1015 and 1020, respectively, are input into the controller 1035 so that the controller can compute the delay on the interconnection associated with the deskew subsystem selected.

Detectors 1025 and 1030 receive inputs directly from the outputs of each deskew subsystem, e.g., 192 and 180, in the digital system. Detector 1025 detects for all "1" values, and detector 1030 detects for all "0" values. The outputs 1080a and 1080b of detectors 1025 and 1030, respectively, are input into the controller 1035 so that the controller 1035 can compute the delays between or among each parallel input interconnection 145a and 145b in the digital system.

The controller 1035, based upon outputs 1075a, 1075b, 1080a and 1080b from detectors 1015, 1020, 1025, and 1030, respectively, determines the three bit delay value for each input interconnection needed to compensate for skew and to align the outputs on each parallel interconnection. These three bit delay values computed by the controller 1035 are fed into registers 1050 and 1055, and the registers 1050 and 1055 are coupled to the deskew subsystems 192 and 180 respectively. In short, there is one three bit delay value for each register and one register for each interconnection.

More particularly, the least significant bit 1090c of the output register 1050 is coupled to the add delay input 320 of retiming subsytem 305 (FIG. 3) for input 145a, while the higher two significant bits 1090a and 1090b of the output register 1050 are coupled to the delay control inputs 325 and 330 of the coarse deskew subsystems 310 and 315, respectively, for input 145a. Similarly, the least significant bit 1095c of the output register 1055 is coupled to the add delay input 320 of retiming subsytem 305 (FIG. 3) for input 145b, while the higher two significant bits 1095a and 1095b of the output register 1055 are coupled to the delay control inputs 325 and 330 of the coarse deskew subsystems 310 and 315, respectively, for input 145b.

Figure 10B:
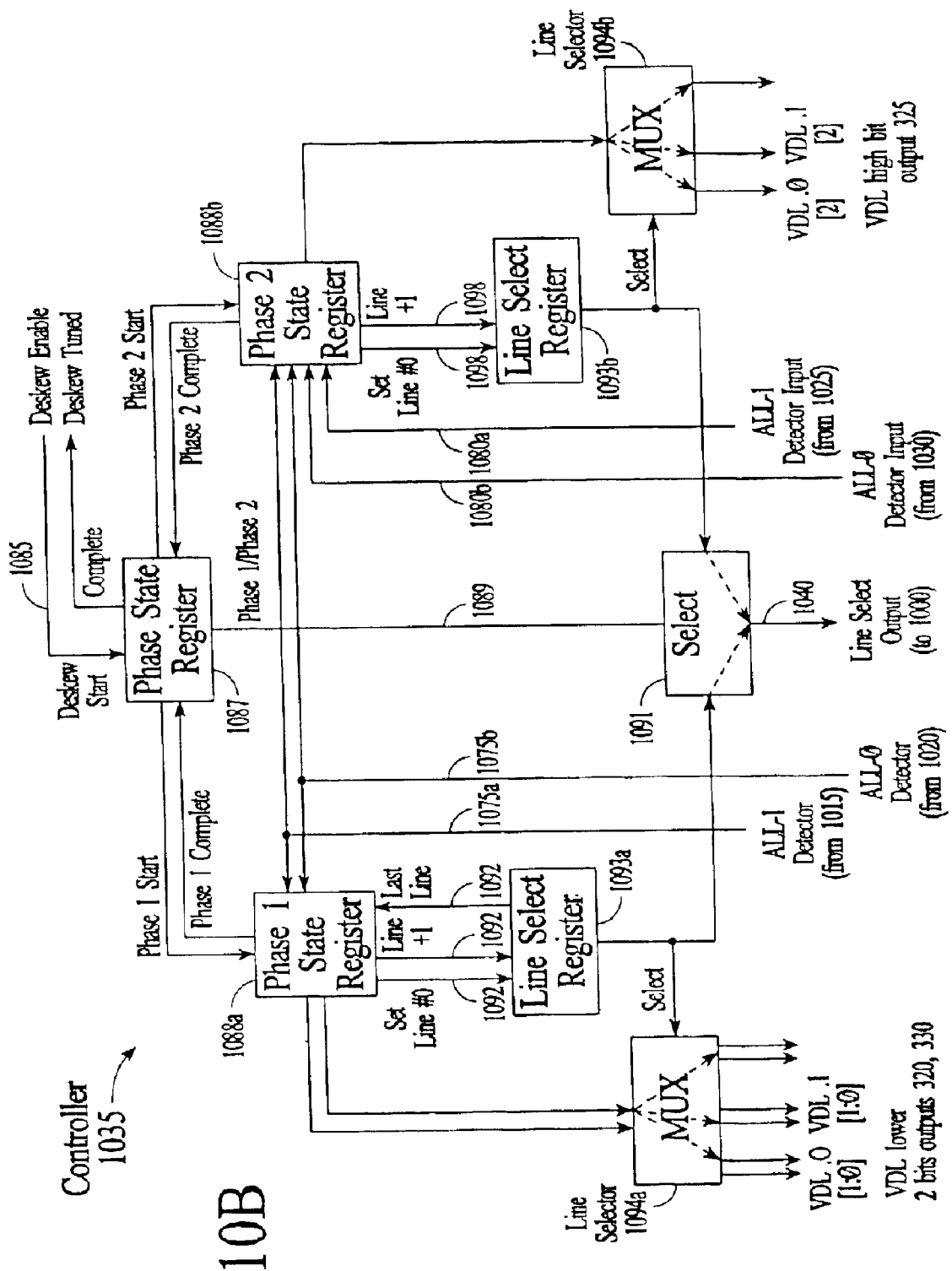
FIG. 10B is a block diagram of a controller for computing delays between or among each parallel input interconnection.

FIG. 10B is a functional block diagram of the controller 1035 in the deskew controller 135 of FIG. 10A. The controller 1035 is enabled by a signal 1085 received from any suitable control unit. As discussed above, one such control unit is disclosed in U.S. patent application Ser. No. 09/249, 825, now U.S. Pat. No. 6,493,320, entitled "Automatic Initialization and Tuning Across a High Speed, Plesiochronous, Parallel Link," which is assigned to the same assignee as this present patent application, and which is hereby incorporated by reference.

Figure 14:
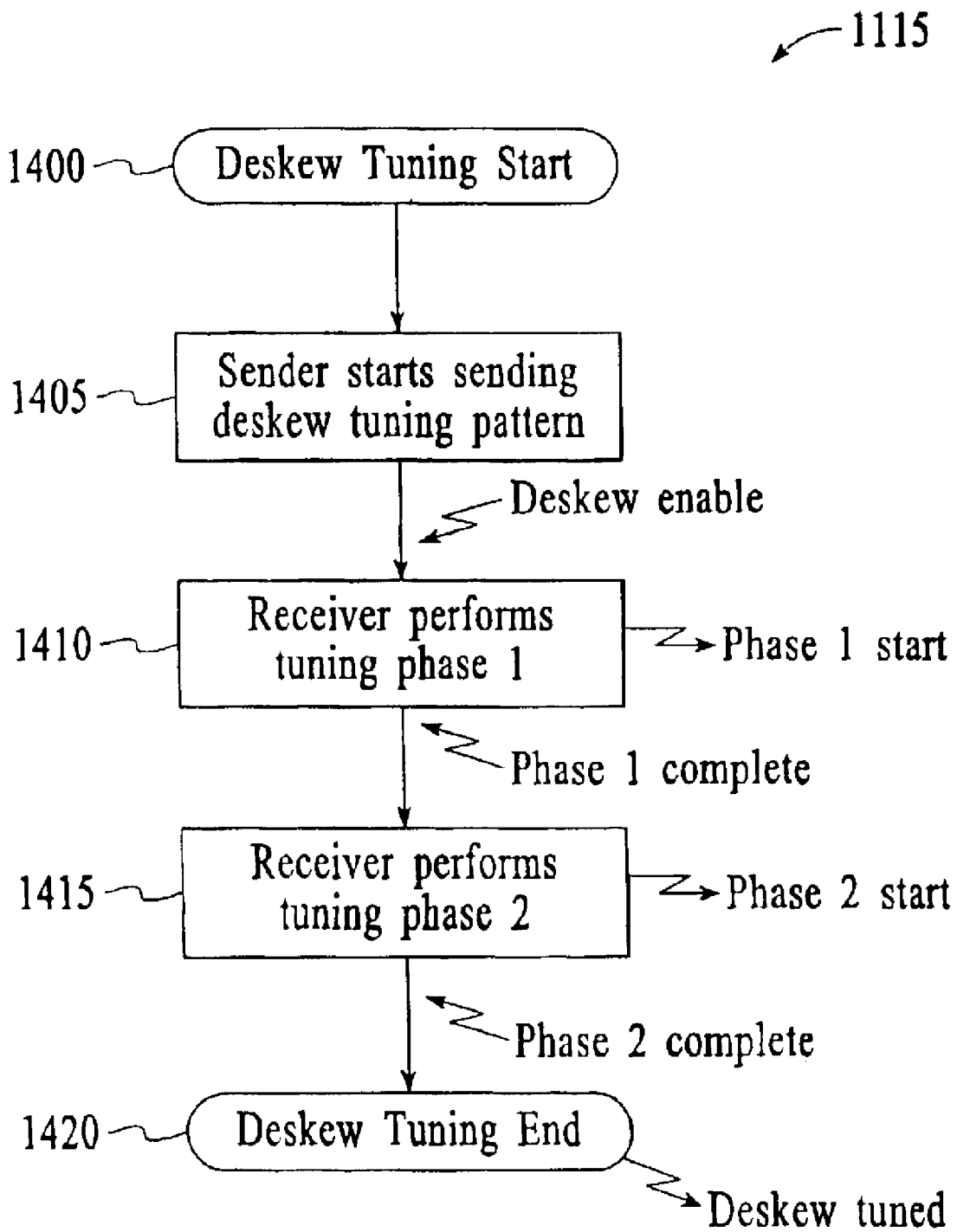
FIG. 14 is a flow diagram illustrating one method of operation of the deskew controller.

A phase state register 1087 triggers a "Phase 1 start" signal in order to start the phase one tuning 1410 (FIG. 14) in response to receiving the deskew enable signal 1085 from any suitable control unit. The phase state register 1087 also generates a control signal 1089 for indicating a phase one tuning 1410 or phase two tuning 1415 procedure to a select stage 1091. The select stage 1091 outputs the control signal 1040 to the selector 1000 (FIG. 10A) for the following purpose. In the phase one tuning procedure 1410 (FIG. 15), the input lines are selected by line select register 1093a (FIG. 10B) by use of selector 1000 (FIG. 10A).

In the phase two tuning procedure 1415 (FIG. 16), the input lines are selected by line select register 1093b (FIG. 10B). The select stage 1091 switches the source of the select value for selector 1000 (FIG. 10A) from registers 1093a or 1093b based on the signal 1089 from the phase state register 1087.

A phase 1 state register 1088a receives the Phase 1 start signal and generates control signals 1092 for input into a line select register 1093a. The line selector 1094a associates a delay value from the phase one state register 1088a with an interconnection whose value is stored in line select register 1093a. In a preferred embodiment, line selector 1094a is a multiplexer whose control values are the outputs of line select register 1093a.

The phase 1 state register 1088a also determines the values of the two least significant bits for providing the delay control bits 320 and 330 (see FIG. 3 and CHART 1). The least significant bit corresponds with bit 320 and the next least significant bit corresponds with bit 330. The phase 1 state register 1088a makes the above value determination based upon the input signals 1075a and 1075b from detectors 1015 and 1020, respectively (see FIG. 10A).

When the phase one tuning 1410 is complete, the phase 1 state register generates a "Phase 1 complete" signal for input into phase state register 1087, and in response the phase state register generates a "Phase 2 start" signal for starting the phase two tuning 1415. A phase 2 state register 1088b generates control signals 1098 for input into a line select register 1093b. The line selector 1094b associates a delay value from the phase two state register 1088b with an interconnection whose value is stored in line select register 1093b. In a preferred embodiment, line selector 1094b is a multiplexer whose control values are the outputs of line select register 1093b.

The line select register 1093b permits a line selector 1094b to select one of the outputs of the deskew subsytems based upon a "select" signal from the line select register 1093b. In a preferred embodiment, the line selector 1094b is a multiplexer.

The phase 2 state register 1088b also determines the values of the most significant bit for providing the delay control value 325 (see FIG. 3 and CHART 1). The phase 2 state register 1088b makes the above value determination based on the input signals 1075a and 1075b from detectors 1015 and 1020, respectively (see FIG. 10A) and from input signal 1080a and 1080b from detectors 1025 and 1030, respectively (see FIG. 10A).

When the phase two tuning 1415 is complete, the phase 2 state register 1088b generates a "Phase 2 complete" signal for input into phase state register 1087, and in response the phase state register generates a "complete" signal that indicates the completion of the deskew tuning procedure in accordance with he present invention. The "complete" signal may be generated to any suitable control unit, as mentioned above.

Figure 11:
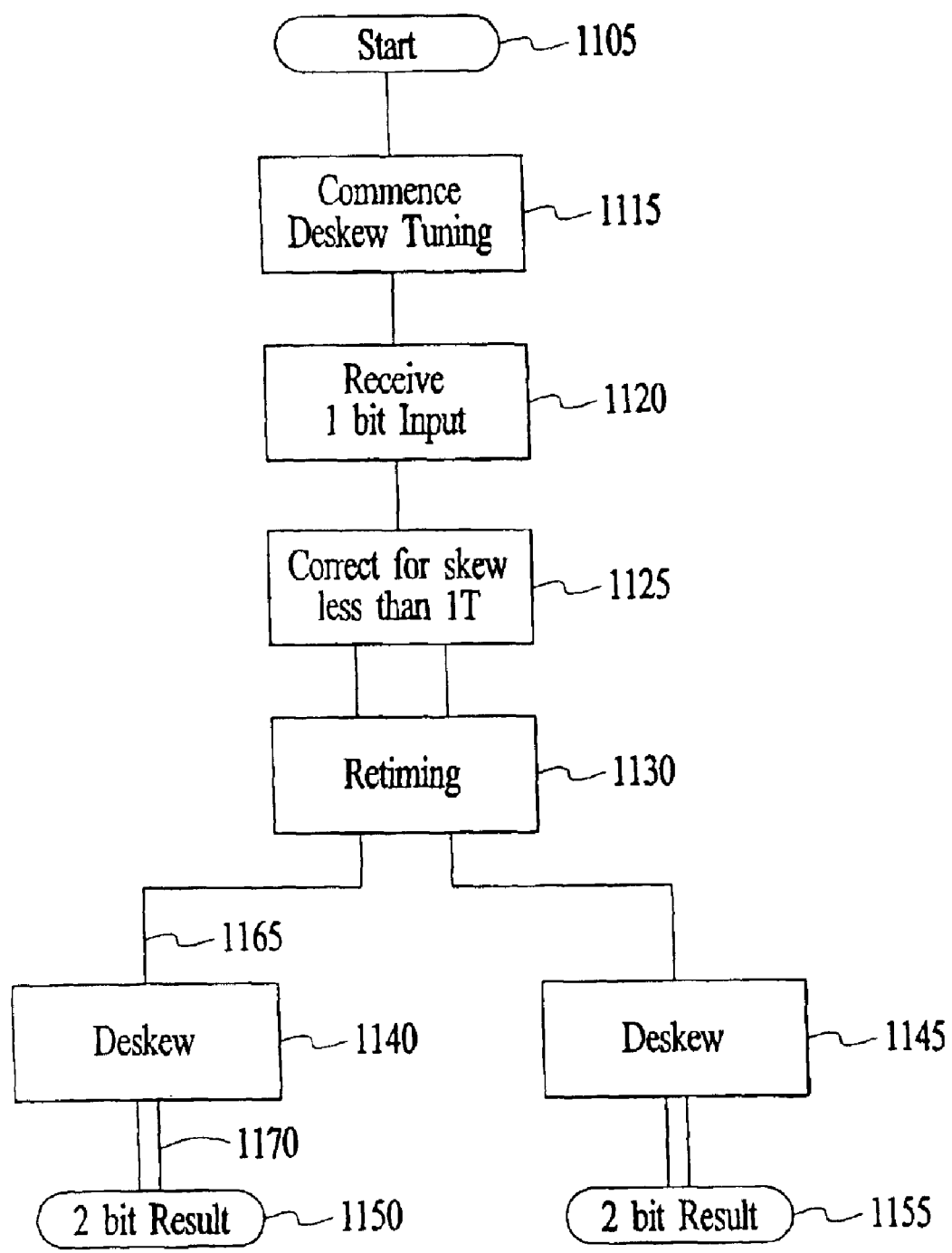
FIG. 11 is a flow diagram illustrating one method of operation of the present invention for a single deskew subsystem.

FIG. 11 illustrates a flow diagram of one embodiment of a method for automatically correcting skew on signals propagating on parallel interconnections in accordance with the present invention. At the start 1105 of the operation, which occurs upon receipt by the controller 1035 of an enabling signal 1085, the deskew controller 135 commences deskew tuning 1115.

During deskew tuning, the deskew controller 135 computes the appropriate delay values for each interconnection to correct for skew on each of the parallel interconnections. Skipping briefly to FIG. 14, one can see that deskew tuning for each interconnection includes the steps of receiving a known deskew initializing pattern 1405 and performing phase one tuning 1410 and phase two tuning 1415. In one embodiment, the deskew initializing pattern is 1111 1111 0000.

In essence, phase one tuning 1410 involves determining the amount of skew on each individual interconnection and aligning each of the four outputs of a deskew subsystem, and phase two tuning 1415 involves determining the amount of delay to add to each interconnection to correct for differing amounts of skew between or among the parallel interconnections in the digital system. In order to perform phase one tuning and phase two tuning, detectors 1015, 1020, 1025 and 1030 search for the known deskew initializing pattern. Based upon the amount of skew observed, the automatic deskew system 100 will frame bits of information on each interconnection (i.e., add delay to the signal on each interconnection) so all outputs are in alignment.

Figure 15:
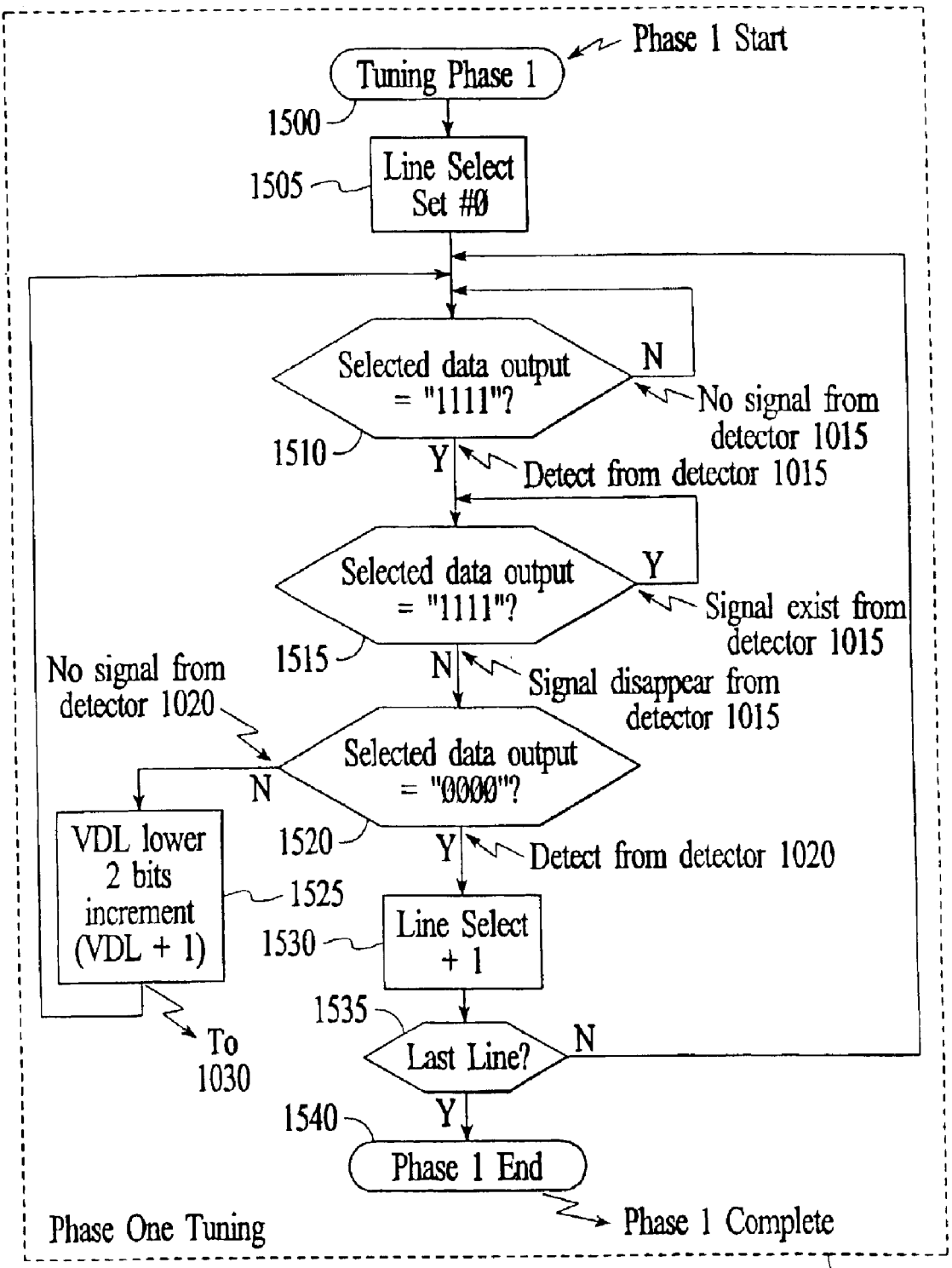
FIG. 15 is a flow diagram illustrating one method of operation of phase one of the deskew controller.

FIG. 15 illustrates a flow diagram of one embodiment of a method for phase one tuning 1410. During phase one tuning, selector 1000 selects 1505 the outputs 160a–160d or 165a–165d of one of the interconnections 145a or 145b, respectively, in the digital system. The deskew controller 135 then uses detector 1015 to determine whether the outputs 1070a–1070d of the selected input line have all "1" values 1510. If the outputs 1070a–1070d do not have all "1" values, the controller 1035 keeps waiting 1510 for all "1" values from detector 1015. If, however, the outputs 1070a–1070d of the selected line have all "1" values, the deskew controller 135 then determines 1515 using detector 1015 whether the outputs 1070a–1070d of the next bit of information transmitted over the selected interconnection have all "1" values.

If the outputs 1070a–1970d do, the controller 1035 keeps waiting for the "not all values are 1" condition. In other words, the controller 1035 keeps waiting until the output signal from detector 1015 disappears. If, however, the outputs 1070a–1970d do not have all "1" values, the deskew controller 135 determines 1520 using detector 1020 whether the outputs 1070a–1070d of the next bit of information transmitted over the selected interconnection have all "0" values.

If the outputs 1070a–1970d do not, the delay control value gets incremented 1525 by one (i.e., if the current delay value on the selected interconnection is 0T, then the current delay value becomes 1T, or, if the current delay value is 1T, then the current delay value becomes 2T, and so forth). The deskew controller 135 then repeats steps 1510, 1515 and 1520 for the delayed signal. If, however, the outputs 1070a–1970d do have all "0" values, the tuning for the selected interconnection is complete and the selector 1000 selects 1530 the next interconnection 1530 and repeats the procedures in 1510, 1515, 1520, 1525, 1530 and 1535 until there are no more interconnections 1535 in the digital system, at which point the phase one tuning is complete 1540.

Figure 16:
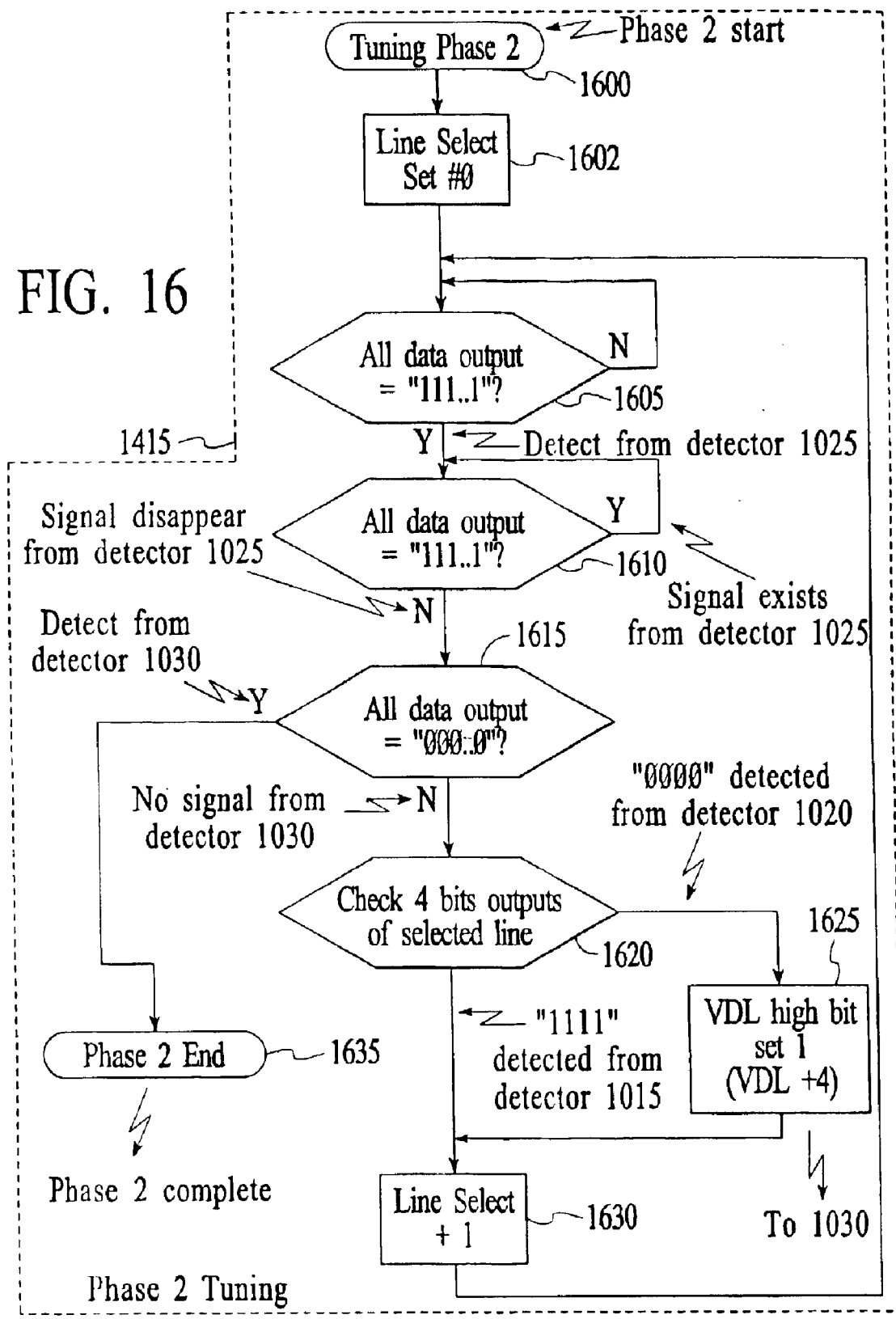
FIG. 16 is a flow diagram illustrating one method of operation of phase two of the deskew controller.

FIG. 16 illustrates the flow diagram of one embodiment of phase two tuning 1415. At the start 1600 of the phase two tuning, the selector 100 selects 1602 the outputs 160a–160d or 165a–165d of interconnections 145a or 145b, respectively. The deskew controller 135 uses detector 1025 to determine 1605 whether all outputs 160a–160d and 165a–165d of each deskew subsystem in the digital system have all "1" values. If all outputs 160a–160d and 165a–165d do not have all "1" values, the controller 1035 keeps waiting for all "1" detected from detector 1025 (as shown in step 1605). If, however, all outputs 160a–160d and 165a–165d of each deskew subsystem have all "1" values, the deskew controller 135 then determines 1610 using detector 1025 whether all outputs 160a–160d and 165a–165d of the next bit of information transmitted over the parallel interconnections have all "1" values.

If all outputs 160a–160d and 165a–165d do have all "1" values, the controller 1035 keeps waiting for a "not all values 1" condition. In other words, the controller 1035 keeps waiting until the output signal from detector 1025 disappears. If, however, all outputs 160a–160d and 165a–165d of each deskew subsystem do not have all "1" values, the deskew controller 135 then determines 1615 using detector 1030 whether all outputs 160a–160d and 165a–165d of the next bit of information transmitted over the parallel interconnections have all "0" values.

In step 1615, if detector 1030 does not detect an "all zero" condition, then the controller 1035 looks at the outputs of detectors 1015 and 1020 (i.e., signal lines 1075a and 1075b, respectively). In step 1620, if a "0000" is detected by detector 1020, then the most significant bit of the delay control three bits is set 1625 to "1", which means that a 4T delay is added to the interconnection (e.g., a 0T delay value becomes a 4T delay value; a 1T delay value becomes a 5T delay value; a 2T delay value becomes a 6T delay value, a 3T delay value becomes a 7T delay value, and so forth).

If, in step 1620, a "1111" is detected by detector 1015, then the delay control is not changed since the interconnection (line) selected in step 1602 is already in alignment with the other parallel interconnections. The selector 1000 then selects 1630 the next interconnection, and steps 1605 to 1630 are repeated so as to align the next interconnection with all the other parallel interconnections.

If, in step 1615, the detector 1030 detects all zeros ("0000 . . . 0"), then the phase two tuning is completed 1635.

Returning to FIG. 11, one can see that after completion of the deskew tuning 1115, the automatic deskew system 100 receives a one bit signal 1120 on input lines 145a and 145b. The clock recovery subsystems 105 and 190 correct for any skew 1125 that is less than one bit time, T, on the parallel interconnections 145a and 145b.

Figure 12:
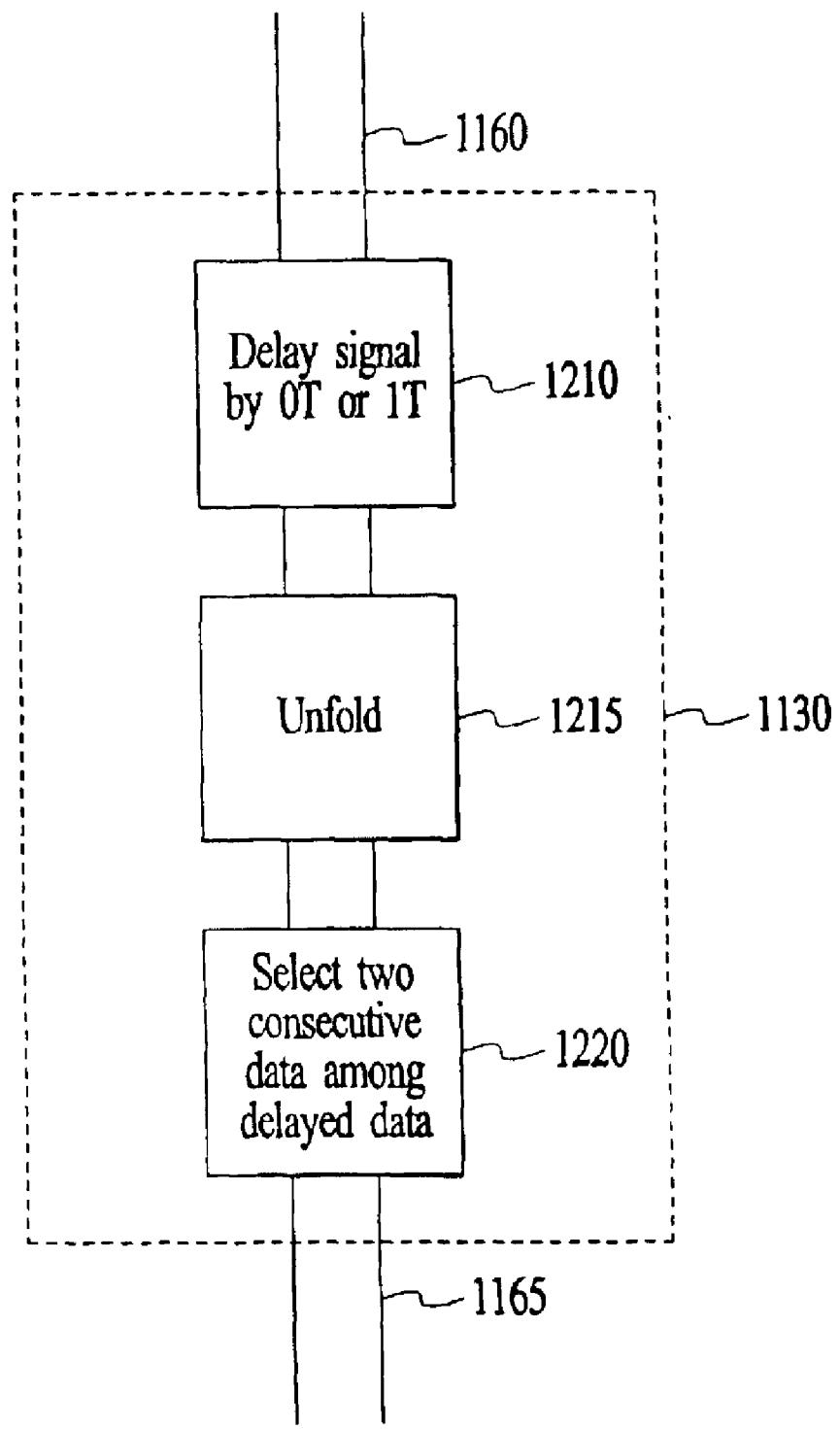
FIG. 12 is a flow diagram illustrating one method of operation of the retiming subsystem.

As shown in greater detail in FIG. 12, the retiming subsystem 305: (i) adds delay 1210 to the signal of 0T or 1T, based upon the value of the one bit add delay 320 computed by the deskew controller 135; (ii) performs a one to two unfolding 1215 the signal; and (iii) selects 1220 two consecutive bits among the delayed and unfolded signal.

Figure 13:
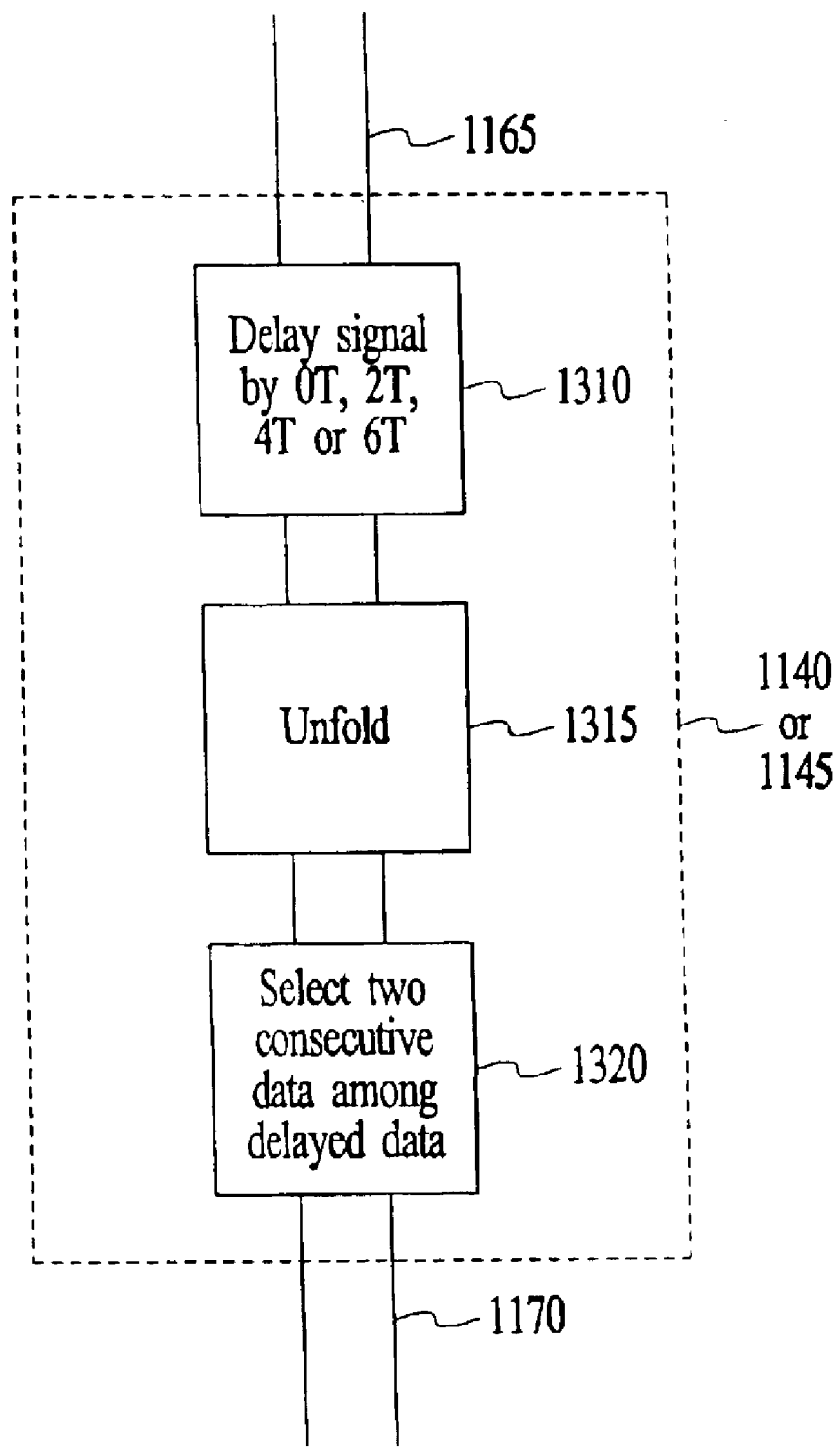
FIG. 13 is a flow diagram illustrating one method of operation of the coarse deskew subsystem.

As shown in FIG. 13, the coarse deskew subsystem 110 and 191 then adds further delay 1310 to the signal received from the retiming subsystem 320 in the amount of 0T, 2T, 4T and 6T, based upon the value of the two bit delay control 325 and 330 computed by the deskew controller 135. In addition, the coarse deskew controller 110 and 191 performs a one to two unfolding 1315 of the received signal and selects 1320 two consecutive bits among the delayed and unfolded signal.

Thus, the end result of the above method performed by the automatic deskew system is a four bit unfolding of the signal on each interconnection corrected for skew so that all outputs on all parallel interconnections in the digital system are in alignment and each output has a transmission rate one-fourth that of the corresponding input signal.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. An automatic deskew system for use in high-speed, parallel interconnections for a digital system for correcting skew greater than or equal to one-half bit time on signals on said parallel interconnections, comprising:

a deskew controller for computing the amount of delay needed for each interconnection to align said signals on each of said interconnections, the deskew controller comprising:
a selector coupled to the outputs of each of said deskew subsystems and configured for selecting between or among the outputs of said deskew subsystems;
two pairs of all-zero and all-one detectors, one pair coupled to the output of said selector and the other pair coupled to the outputs of said deskew subsystems, said all-zero detector configured for indicating whether all the inputs thereto are zeroes, said all-one detector configured for indicating whether all the inputs thereto are ones;
a controller coupled to said selector and said pairs of all-zero and all-one detectors, said controller configured for computing and sending a control value to said selector for selection between or among the outputs of said deskew subsystems; and a plurality of registers coupled to said controller and said deskew subsystems, said registers containing delay control values computed by said deskew controller for correcting skew on each interconnection; and a plurality of deskew subsystems, each of said deskew subsystems couple to an associated interconnection and to said deskew controller, each deskew subsystem configured for (i) unfolding a signal on an associated interconnect on, and (ii) correcting any skew in said signal greater than or equal to bit time based upon the amount of delay computed by said deskew controller.

2. The automatic deskew system in claim 1, wherein the controller comprises:

a phase state register for receiving a signal to enable initiation and termination of phase one and phase two tuning for determining delay values;

a phase one state register coupled to said phase state register and for receiving a phase one tuning start signal from said phase state register and to compute delay values;

a phase one line selector coupled to said phase one state register and configured for selecting the outputs of one of several interconnections in said digital system and associating a delay value computed by said phase one state register therewith; a phase one line select register coupled to said phase one state register and said phase one line selector, said phase one line select register configured for computing control signals for said phase one line selector;

a phase two state register coupled to said phase state register and for receiving a phase two tuning start signal from said phase state register and to compute delay values; a phase two line selector coupled to said phase two state register and configured for selecting the outputs of one of several interconnections in said digital system and associating a delay value computed by said phase two state register therewith;

a phase two line select register coupled to said phase two state register an said phase two line selector, said phase two line select register configured for computing control signals for said phase two line selector; and a select stage coupled to and for receiving input signals from said phase state register, said phase one line select register and said phase two line select register.

3. The automatic deskew system in claim 2, wherein the select stage comprises a multiplexer for selecting control values, wherein said control values are the outputs of said phase one line select register or said phase two line select register.

4. The automatic deskew system in claim 2, wherein the phase one line selector and the phase two line selector each comprises a multiplexer.

5. The automatic deskew system of claim 1 wherein the deskew subsystem comprises:

a clock recovery subsystem for correcting skew which is less than one bit time; and a retiming/deskew subsystem coupled to said clock recovery subsystem and configured to compensate for skew in response to the amount of delay computed by said deskew controller.

6. The automatic deskew system of claim 5 wherein the retiming/deskew subsystem comprises:

a retiming subsystem for delaying said signal by zero bit time or one bit time in response to said computed delay and for unfolding said signal; and two coarse deskew subsystems, coupled to said retiming subsystem, for delaying a signal received from said retiming subsystem by integer multiples of two times one bit time in response to said computed delay and for unfolding said signal received from said retiming subsystem.

7. The automatic deskew system of claim 6 wherein the retiming subsystem comprises:

a plurality of registers coupled to perform a one to two unfolding of said signal on said associated interconnection, with a delay of zero bit time or one bit time; and a multiplexer coupled to said registers, said multiplexer for receiving the computed delay and configured for selecting two consecutive bits of said unfolded signal in response to the computed delay.

8. The automatic deskew system of claim 6 wherein a coarse deskew subsystem comprises:

a plurality of registers coupled to perform a one to two unfolding of said signal received from said retiming subsystem, with a delay of zero bit time or an even number of bit time; and a multiplexer coupled to said registers, said multiplexer for receiving the computed delay and configured for selecting two consecutive bits of said unfolded signal in response to the computed delay.

9. An automatic deskew system for use in high-speed, parallel interconnections for a digital system for correcting skew on signals on said parallel interconnections, comprising:

a sender for supplying a deskew initializing pattern to said parallel interconnections;

a deskew controller responsive to said deskew initializing pattern for computing the amount of delay needed for each interconnection to align the signal on each interconnection, the deskew controller comprising a selector coupled to the outputs of each of said deskew subsystem and configured for selecting between or among the outputs of said deskew subsystems;

two pairs of all-zero and all-one detectors, one pair coupled to the output of said selector and the other pair coupled to the outputs of said deskew subsystems, said all-zero detector configured for indicating whether all the inputs thereto are zeroes, said all-one detector configured for indicating whether all the inputs thereto are ones;

a controller coupled to said selector and said pairs of all-zero and all-one detectors, said controller configured for computing and sending a control value to said selector for selection between or among the outputs of said deskew subsystems; and a plurality of registers coupled to said controller and said deskew subsystems, said registers containing delay control values computed by said deskew controller for correcting skew on each interconnection; an a plurality of deskew subsystems, each of said deskew subsystems couple to an associated interconnection and to said deskew controller, each deskew subsystem configured for (i) unfolding a signal on an associated interconnection, and (ii) correcting any skew in said signal based upon the amount of delay computed by said deskew controller.

10. The automatic deskew system in claim 9, wherein the controller comprises:

a phase state register for receiving a signal to enable initiation and termination of phase one and phase two tuning for determining delay values; a phase one state register coupled to said phase state register and for receiving a phase one tuning start signal from said phase register and to compute delay values;

a phase one line selector coupled to said phase one state and configured for selecting the output of one of several interconnections in said digital system and associating a delay value computed by said phase one state register therewith; a phase one line select register coupled to said phase one state register and said phase one line selector, said phase one line select register configured for computing control signals for said phase one line selector;

a phase two state register coupled to said phase state register and for receiving a phase two tuning start signal from said phase state register and to compute delay values; a phase two line selector coupled to said phase two state register and configured for selecting the outputs of one of several interconnections in said digital system and associating a delay value computed by said phase two register therewith;

a phase two line select register coupled to said phase two state register and said phase two line selector, said phase two line select register configured for computing control signals for said phase two line selector; and a select stage coupled to and for receiving input signals from said phase state register, said phase one line select register and said phase two line select register.

11. The automatic deskew system in claim 10, wherein the select stage comprises a multiplexer for selecting control values, wherein said control values are the outputs of said phase one line select register or said phase two line select register.

12. The automatic deskew system in claim 10, wherein the phase one line selector and the phase two line selector each comprises a multiplexer.

13. The automatic deskew system of claim 9 wherein the deskew subsystem comprises:
a clock recovery subsystem for correcting skew which is less than one bit time; and
a retiming/deskew subsystem coupled to said clock recovery subsystem and configured to compensate for skew in response to the amount of delay computed by said deskew controller.

14. The automatic deskew system of claim 13 wherein the retiming/deskew subsystem comprises:
a retiming subsystem for delaying said signal by zero bit time or one bit time in response to said computed delay and for unfolding said signal; and
two coarse deskew subsystems, coupled to said retiming subsystem, for delaying a signal received from said retiming subsystem by integer multiples of two times one bit time in response to said computed delay and for unfolding said signal received from said retiming subsystem.

15. The automatic deskew system of claim 14 wherein the retiming subsystem comprises:
a plurality of registers coupled to perform a one to two unfolding of said signal on said associated interconnection, with a delay of zero bit time or one bit time; and
a multiplexer coupled to said registers, said multiplexer for receiving the computed delay and configured for selecting two consecutive bits of said unfolded signal in response to the computed delay.

16. An automatic deskew system for use in high-speed, parallel interconnections for a digital system for correcting skew on signals on said parallel interconnections, comprising:
a deskew controller for computing the amount of delay needed for each interconnection to align signals on each interconnection, the deskew controller comprising:
a selector coupled to the outputs of each of said deskew subsystems and configured for selecting between or among the outputs of said deskew subsystems;
two pairs of all-zero and all-one detectors, one pair coupled to the output of said selector and the other pair coupled to the outputs of said deskew subsystems, said all-zero detector configured for indicating whether all the inputs thereto are zeroes, said all-one detector configured for indicating whether all the inputs thereto are ones;
a controller coupled to said selector and said pairs of all-zero and all-one detectors, said controller configured for computing and sending a control value to said selector for selection between or among the outputs of said deskew subsystems; and
a plurality of registers coupled to said controller and said deskew subsystems, said registers containing delay control values computed by said deskew controller for correcting skew on each interconnection; and
a plurality of deskew subsystems, each of said deskew subsystems couple to an associated interconnection and to said deskew controller, each deskew subsystem configured for (i) unfolding a signal on an associated interconnection, and (ii) correcting any skew in said signal by adding delay to said unfolded signal and selecting two consecutive bits from said unfolded and delayed signal based upon the amount of delay computed by said deskew controller.

17. The automatic deskew system in claim 16 wherein the controller comprises:
a phase state register for receiving a signal to enable initiation and termination of phase one and phase two tuning for determining delay values;
a phase one state register coupled to said phase state register and for receiving a phase one tuning start signal from said phase state register and to compute delay values;
a phase one line selector coupled to said phase one state register and configured for selecting the outputs of one of several interconnections in said digital system and associating a delay value computed by said phase one state register therewith;
a phase one line select register coupled to said phase one state register and said phase one line selector, said phase one line select register configured for computing control signals for said phase one line selector;
a phase two state register coupled to said phase state register and for receiving a phase two tuning start signal from said phase state register and to compute delay values; a phase two line selector coupled to said phase two state register and configured for selecting the outputs of one of several interconnections in said digital system and associating a delay value computed by said phase two state register therewith;
a phase two line select register coupled to said phase two state register an said phase two line selector, said phase two line select register configured for computing control signals for said phase two line selector; and a select stage coupled to and for receiving input signals from said phase state register, said phase one line select register and said phase two line select register.

18. The automatic deskew system in claim 17, wherein the select stage comprises a multiplexer for selecting control values, wherein said control values are the outputs of said phase one line select register or said phase two line select register.

19. The automatic deskew system in claim 17, wherein the phase one line selector and the phase two line selector each comprises a multiplexer.

20. The automatic deskew system of claim 16 wherein the deskew subsystem comprises:
   a clock recovery subsystem for correcting skew which is less than one bit time; and
   a retiming/deskew subsystem coupled to said clock recovery subsystem and configured to compensate for skew in response to the amount of delay computed by said deskew controller.

21. The automatic deskew system of claim 20 wherein the retiming/deskew subsystem comprises:
   a retiming subsystem for delaying said signal by zero bit time or one bit time in response to said computed delay and for unfolding said signal; and
   two coarse deskew subsystems, coupled to said retiming subsystem, for delayinga signal received from said retiming subsystem by integer multiple of two times one bit time in response to said computed delay and for unfolding said signal received from said retiming subsystem.

22. The automatic deskew system of claim 21 wherein the retiming subsystem comprises:
   a plurality of registers coupled to perform a one to two unfolding of said signal on said associated interconnection, with a delay of zero bit time or one bit time; and
   a multiplexer coupled to said registers, said multiplexer for receiving the computed delay and configured for selecting two consecutive bits of said unfolded signal in response to the computed delay.

23. The automatic deskew system of claim 21 wherein a coarse deskew subsystem comprises:
   a plurality of registers coupled to perform a one to two unfolding of said signal received from said retiming subsystem, with a delay of zero bit time or an even number of bit time; and
   a multiplexer coupled to said registers, said multiplexer for receiving the computed delay and configured for selecting two consecutive bits of said unfolded signal in response to the computed delay.

* * * * *

UNITED STATES PATENT AND TRADEMARK OFFICE
CERTIFICATE OF CORRECTION

PATENT NO. : 6,898,742 B2
DATED : May 24, 2005
INVENTOR(S) : Yoichi Koyanagi et al.

It is certified that error appears in the above-identified patent and that said Letters Patent is hereby corrected as shown below:

Column 11,
Line 13, please delete "interconnect on" and insert -- interconnection --.
Line 14, please insert -- one-half -- after "equal to".
Line 43, please delete "an" and insert -- and --.

Column 12,
Line 38, please delete "signal" and insert -- signals --.
Line 41, please delete "subsystem" and insert -- subsystems --.
Line 58, please delete "an" and insert -- and --.
Line 60, please delete "couple" and insert -- coupled --.

Column 13,
Line 8, please insert -- register -- before "and configured" and
please delete "output" and insert -- outputs --.

Column 14,
Line 65, please delete "an" and insert -- and --.

Signed and Sealed this

Thirtieth Day of August, 2005

JON W. DUDAS
*Director of the United States Patent and Trademark Office*